US008634096B2

United States Patent
Kawabata et al.

(10) Patent No.: US 8,634,096 B2
(45) Date of Patent: *Jan. 21, 2014

(54) APPARATUS, SYSTEM, METHOD, AND MEDIUM FOR DATA CONTROL WHICH ENABLE POWER SAVING BASED ON POWER-ON INFORMATION

(75) Inventors: Shinichi Kawabata, Hino (JP); Kanehiro Watanabe, Sagamihara (JP)

(73) Assignee: Konica Minolta Business Technologies, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,915

(22) Filed: Dec. 16, 2011

(65) Prior Publication Data

US 2012/0162710 A1    Jun. 28, 2012

(30) Foreign Application Priority Data

Dec. 28, 2010    (JP) .................................. 2010-294160

(51) Int. Cl.
G06F 3/12    (2006.01)
(52) U.S. Cl.
USPC ............................ 358/1.15; 358/1.1; 358/1.14
(58) Field of Classification Search
USPC ................................................. 358/1.14, 1.1
See application file for complete search history.

(56) References Cited

U.S. PATENT DOCUMENTS

2003/0191975 A1*  10/2003  Kohara .......................... 713/300
2009/0300214 A1*  12/2009  Ogata ............................ 709/238

FOREIGN PATENT DOCUMENTS

JP    2002-182885 A    6/2002

* cited by examiner

*Primary Examiner* — Qian Yang
*Assistant Examiner* — Martin Mushambo
(74) *Attorney, Agent, or Firm* — Cantor Colburn LLP

(57) ABSTRACT

A data control apparatus, which is connected to a plurality of information processing apparatus and controls information, relating to an image forming apparatus, transmitted from the information processing apparatus, the data control apparatus including: a communication section to receive power-on information, transmitted from the information processing section, for making the image forming apparatus into a power-on state, and identification information indicating a user who uses the information processing apparatus having transmitted the power-on information or the information processing apparatus having transmitted the power-on information; and a control section to control a number of power-on times of the image forming apparatus based on the power-on information and the identification information, received by the communication section.

13 Claims, 13 Drawing Sheets

| USER | TIME | | |
|---|---|---|---|
| | 9:00 - 10:00 | 10:00 - 11:00 | ... |
| USER A | - | - | ... |
| USER B | - | 10:08 | ... |
| USER C | 9:10 | 10:16 | ... |
| USER D | *9:35 | - | ... |

*: NO JOB TRANSMISSION

| STATUS | | | ENERGY SAVING CONTRIBUTION RATE | POINT |
|---|---|---|---|---|
| CONDITION | JOB | POWER SOURCE OF IMAGE FORMING APPARATUS | | |
| THIS USER DOES NOT POWER ON IMAGE FORMING APPARATUS, AND DOES NOT TRANSMIT A JOB | UNUSED | - | 1ST | +1 |
| THIS USER POWERED ON IMAGE FORMING APPARATUS, AND TRANSMITTED A JOB | USED | ON | 2ND | 0 |
| THIS USER DOES NOT POWER ON IMAGE FORMING APPARATUS, AND TRANSMITTED A JOB | USED | - | | |
| THIS USER POWERED ON IMAGE FORMING APPARATUS, AND DOES NOT TRANSMIT A JOB | UNUSED | ON | 3RD | -1 |

|        | 9:00 - 10:00 | 10:00 - 11:00 |  | COUNTING RESULT |
|--------|--------------|---------------|--|-----------------|
| USER A | +1           | 0             |  | +6              |
| USER B | +1           | +1            |  | +4              |
| USER C | 0            | +1            |  | 0               |
| USER D | -1           | 0             |  | -2              |

| ORDER | USER          |
|-------|---------------|
| 1     | JOB OF USER B |
| 2     | JOB OF USER C |
| 3     | JOB OF USER A |
| 4     | JOB OF USER D |
| ...   | ...           |

| ORDER | USER |
|---|---|
| 1 | JOB JBb OF USER B (BEFORE EXECUTION) |
| 2 | JOB JBc OF USER C |
| 3 | JOB JBa OF USER A |
| ... | ... |

| ORDER | USER |
|---|---|
| 1 | JOB JBa OF USER A |
| 2 | JOB JBb OF USER B |
| 3 | JOB JBc OF USER C |
| ... | ... |

FIG. 14
| ORDER | USER |
|---|---|
| 1 | JOB JBb OF USER B (UNDER EXECUTION) |
| 2 | JOB JBc OF USER C |
| 3 | JOB JBa OF USER A |
| ... | ... |
| ORDER | USER |
|---|---|
| 1 | JOB JBb OF USER B (UNDER EXECUTION) |
| 2 | JOB JBa OF USER A |
| 3 | JOB JBc OF USER C |
| ... | ... |

FIG. 17
| SEP. 1ST | SEP. 2ND | SEP. 3RD | SEP. 4TH | SEP. 5TH |
|---|---|---|---|---|
| COUNTING PERIOD | ➡ GRANTED PERIOD | | | |
| | COUNTING PERIOD | ➡ GRANTED PERIOD | | |
| | | COUNTING PERIOD | ➡ GRANTED PERIOD | |
| | | | COUNTING PERIOD | ➡ GRANTED PERIOD |
| | | | | COUNTING PERIOD |
FIG. 18
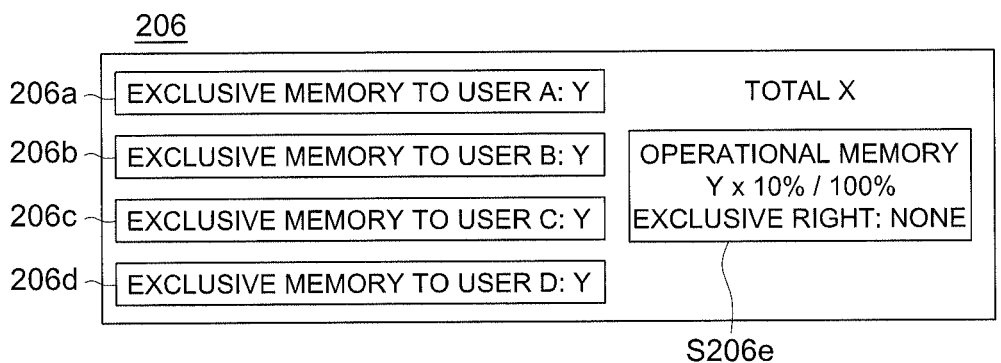
FIG. 19
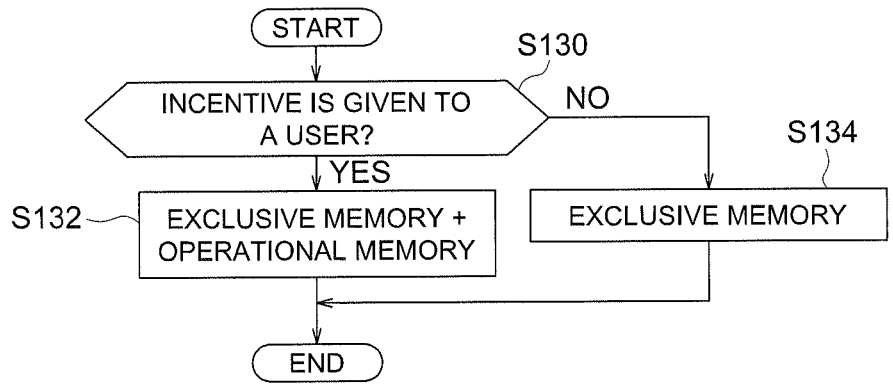

APPARATUS, SYSTEM, METHOD, AND MEDIUM FOR DATA CONTROL WHICH ENABLE POWER SAVING BASED ON POWER-ON INFORMATION

CROSS REFERENCE TO RELATED APPLICATION

The present application is based on Japanese Patent Application No. 2010-294160 filed with Japanese Patent Office on Dec. 28, 2010, the entire content of which is hereby incorporated by reference.

BACKGROUND OF THE INVENTION

1. Technical Field

The present invention relates to a data control apparatus, an image forming system, a data control method and a recording medium recorded therein a data control program. More specifically, the present invention relates to technologies to improve consciousness for energy saving in image forming apparatus, and to effectively promote the energy saving of the image forming apparatus, by giving an incentive or a negative incentive to a user with respect to a job execution order and/or memory usage amount, based on a number of power-on times of the image forming apparatus.

2. Background Technology

In recent years, an image forming apparatus provided with multiple functions such as a printer, facsimile, and a scanner has been commonly used. To the image forming apparatus, a plurality of computers are connected via a network, and based on a job transmitted from each computer, prescribed processing such as a printing is executed by the image forming apparatus. Relating to such configured image forming system, a technology is proposed in which, in cases where main power source of the image forming apparatus is in OFF state, by making its main power source to be ON state by remote operation of the computer to allow the warming up of the image forming apparatus in order to shorten a first printout time (see Patent Document 1: JP2002-182885A).

Further, for the purpose of reducing power consumptions of the image forming apparatus, recent image forming apparatus is provided with a power saving mode for suppressing the power consumption of the image forming apparatus. By setting this power saving mode, after a certain time period has elapsed form a completion of a print job and the like, the image forming apparatus automatically switches to the power save mode, and power saving of the image forming apparatus is achieved. Further, in the power saving mode, when receiving a job signal from the computer, the image forming apparatus returns from the power saving mode to power-on state.

However, in the image forming system described in the above mentioned Patent Document 1, there are following problems. In a common image forming apparatus, since the power-ON state continues until the user directly puts the power of the image forming apparatus into power-OFF state, useless power may be consumed more than necessary, which is a problem. For example, cases may be happen that even after putting the image forming apparatus in ON state, there is no job to be executed for some period, or that the power of image forming apparatus is turned on even with no job to be executed being available. While, there may be a case that even in the image forming apparatus having been set in power saving mode, since the image forming apparatus is in power ON state until its setting time, the useless power may be consumed until its switching time, which is a problem.

The present invention is achieved in view of the above described problems, and the objective is to provide a data control apparatus, an image forming system, a data control method and a recording medium recorded therein a data control program which enable to effectively promote the energy saving of the image forming apparatus.

SUMMARY OF THE INVENTION

In order to solve the above mentioned problems, a data control apparatus, reflecting one aspect of the feature of the present invention, is connected to a plurality of information processing apparatus and controls information, relating to an image forming apparatus, transmitted from the information processing apparatus, and the data control apparatus including:

a communication section to receive power-on information, transmitted from the information processing section, for making the image forming apparatus into a power-on state, and identification information indicating a user who uses the information processing apparatus having sent the power-on information or the information processing apparatus having transmitted the power-on information; and a control section to control a number of power-on times of the image forming apparatus based on the power-on information and the identification information, received by the communication section.

Further, an image forming system relating to another aspect of the present invention is the image forming system including a plurality of information processing apparatus, a data control apparatus, and an image forming apparatus which are connected with each other, wherein the information processing apparatus comprises a first communication section to transmit power-on information for making the image forming apparatus into a power-on state, and identification information indicating a user who uses the information processing apparatus or indicating the information processing apparatus, and the data control apparatus or the image forming apparatus comprises:

a second communication section to receive, from the information processing apparatus, power-on information, and identification information indicating a user who uses the information processing apparatus having transmitted the power-on information or indicating the information processing apparatus having transmitted the power-on information; and a control section to control a number of power-on times of the image forming apparatus based on the power-on information and the identification information.

Further, a data control method relating to another aspect of the present invention is the data control method for an image forming system including a plurality of information processing apparatus, a data control apparatus, and an image forming apparatus which are connected with each other, the data control method including:

a step, by the information processing apparatus, of transmitting power-on information for making the image forming apparatus into a power-on state, and identification information indicating a user who uses the information processing apparatus or the information processing apparatus, and the steps, by the data control apparatus or the image forming apparatus, of:

receiving, from the information processing apparatus, power-on information, and identification information indicating a user who uses the information processing apparatus having transmitted the power-on information or the information processing apparatus having transmitted the power-on information; and controlling a number of power-on times of the image forming apparatus based on the power-on information and the identification information indicating the user who uses the information processing apparatus or indicating the information processing apparatus.

Further, a recording medium relating to the present invention is a non-transitory recording medium recorded therein a data control program to execute the steps of the data control method including:

a step, by the information processing apparatus, of transmitting power-on information for making the image forming apparatus into a power-on state, and identification information indicating a user who uses the information processing apparatus or the information processing apparatus, and the steps, by the data control apparatus or the image forming apparatus, of:

receiving, from the information processing apparatus, power-on information, and identification information indicating a user who uses the information processing apparatus having transmitted the power-on information or the information processing apparatus having transmitted the power-on information; and controlling a number of power-on times of the image forming apparatus based on the power-on information and the identification information indicating the user who uses the information processing apparatus or indicating the information processing apparatus.

According to the present invention, a number of power-on times of the image forming apparatus is controlled by the control section based on the power-on information transmitted from the information processing apparatus. For example, based on the power-on information and the identification information indicating the user who uses the information processing apparatus or the information processing apparatus an energy saving contribution rate is given for an energy saving effect of the image forming apparatus according to the number of power-on times. And, based on the counting result of the energy saving contribution rate, an incentive or a negative incentive is given for using the image forming apparatus. As for the incentive/negative incentive, for example, priority of order of executing the job is ascended/descended, or a usable memory amount is increased/reduced.

Here, the data control program of the present invention is, for example, a computer program which can be provided to a general-purpose computer system executable of various program code through a recording medium and/or communication medium to be provided in a computer readable format such as an optical disc, a magnetic disc and a semiconductor memory, or through communication medium such as a network. By providing such the program with the computer-readable format, a process is realized on the system according to the program.

BRIEF DESCRIPTION OF THE DRAWINGS

These and other objects, advantages and features of the invention will become apparent from the following description thereof taken in conjunction with the accompanying drawings in which:

FIG. 4 is a drawing to show a configuration example of power-on time control data table;

FIG. 5 is a drawing to show a configuration example of energy saving contribution rate grant table;

FIG. 6 is a drawing to show a configuration example of point spreadsheet;

FIG. 7 is a drawing to show a configuration example of job schedule;

FIG. 14 is a drawing to explain an operation example (No. 2) of the server in case of changing a job execution order in the job schedule;

FIG. 17 is a drawing to show an example of relationship between a counting period and a granted period;

FIG. 18 is a drawing to show a configuration example of a memory of a server in the image forming system relating to the second embodiment of the present invention;

FIG. 19 is a flowchart to show an operation example of the server in case of having granted the incentive;

DETAILED DESCRIPTION OF THE PREFERRED EMBODIMENTS

Hereinafter, the best mode for executing the invention (hereinafter referred as an embodiment) will be described.

1. The First Embodiment

[Example of Image Forming System Configuration]

Figure 1:
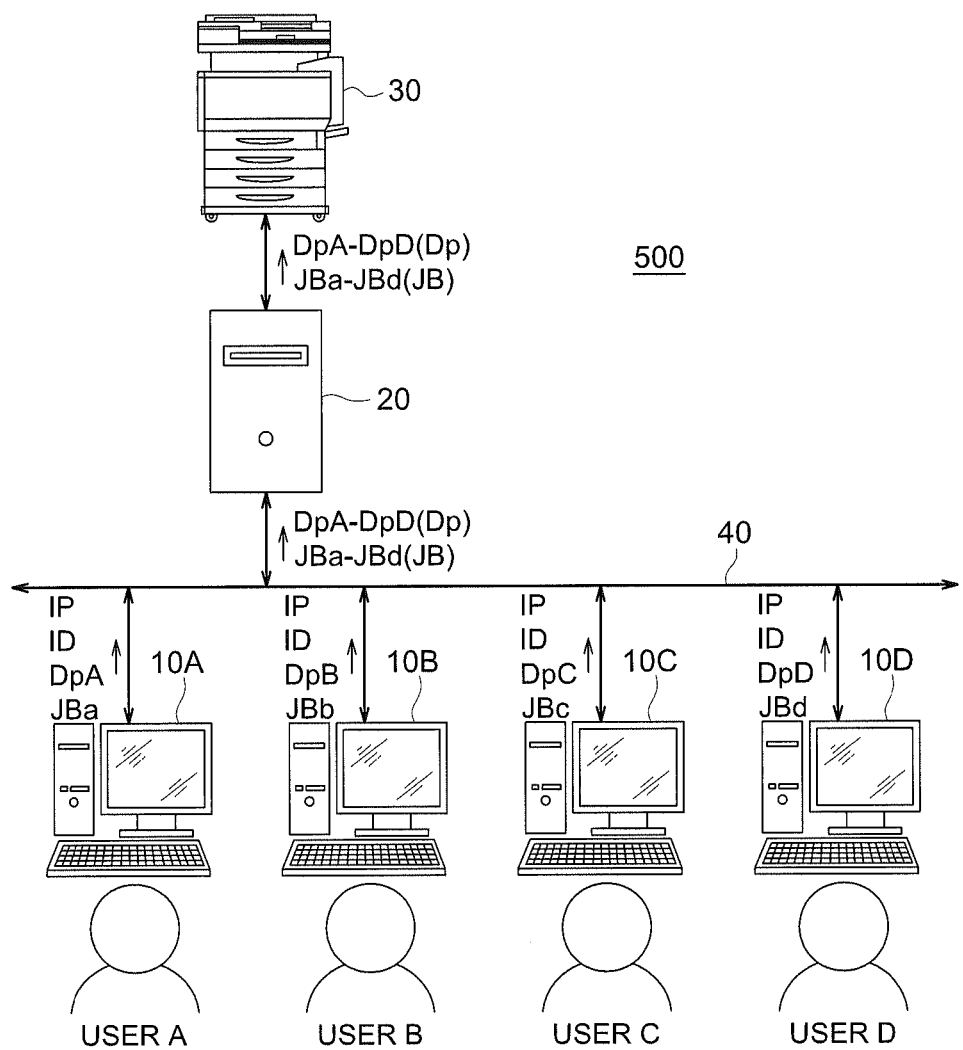
FIG. 1 is a drawing to show a configuration example of an image forming system relating to the first embodiment of the present invention.

FIG. 1 shows a configuration example of image forming system 500 relating to the present invention. As shown in FIG. 1, the image forming system 500 is provided with a plurality of information processing apparatus 10, server 20, and image forming apparatus 30. In this example, as the plurality of information processing apparatus 10, a case is described where four units of information processing apparatuses 10A, 10B, 10C, and 10D are utilized. The plurality of information processing apparatus 10, the server 20, and the image forming apparatus 30 are connected with each other via network 40 such as a LAN (Local Area Network), and configured to be capable of bi-directional communication.

The information processing apparatus 10 is, for example, configured with a general personal computer and the like, and transmits a job JB corresponding to the user's input operation and/or power-on information (power-on signal) Dp for making the power of image forming apparatus 30 into power ON state, via the network 40 to the server 20. The server 20 is an example of the data control apparatus, which records and controls the job JB and power-on information Dp being transmitted from the information processing apparatus 10. Further, the server 20 calculates a energy saving contribution rate with respect to the image forming apparatus 30 according to the number of power-no operation times based on the power-on information Dp, and based on this calculation result, gives an incentive or a negative-incentive to each user. The image forming apparatus 30 prints a prescribed image on a sheet or put on the power based on the job JB and power-on information Dp supplied from the server 20.

[Block Configuration Example of Information Processing Apparatus]

Figure 2:
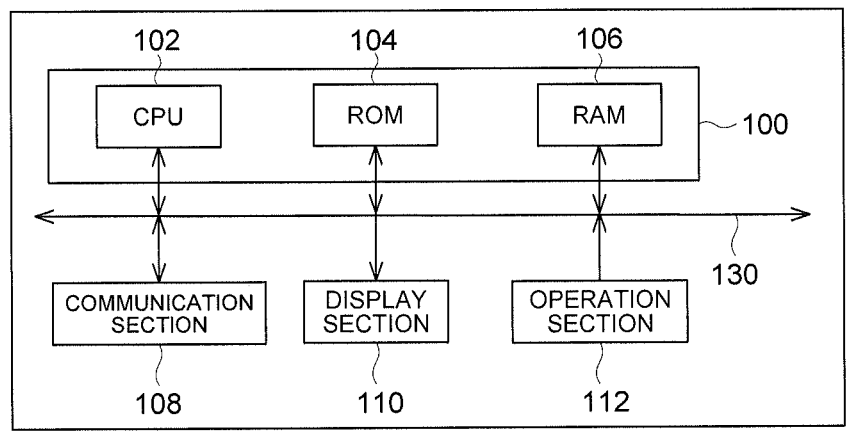
FIG. 2 is a drawing to show a block configuration example of information processing apparatus.

Since each of the four units of information processing apparatus 10A, 10B, 10C and 10D has the same configuration and functions with each other, hereinafter, information processing apparatus 10A is described as a representative. FIG. 2 shows a block configuration example the information processing apparatus 10A. As shown in FIG. 2, the information processing apparatus 10A is provided with control section 100 to control the total operation of information processing apparatus 10A. The control section 100 has CPU (Central Processing Unit) 102, ROM (Read Only Memory) 104, and RAM (Random Access Memory) 106. The CPU 102 develops a program and data having read from the ROM 104 on the RAM 106 and activates the program to control an operation of each part of the information processing apparatus 10A.

To the control section 100, communication section 108, display section 110, and operation section 112 are connected via bus 130. The communication section 108 is configured with a modem, router and the like, establishes a communication between the server 20 via the network 40, and transmits the job JB, the power-on information DpA for making the power on of the image forming apparatus 30, and the like toward the server 20, based on instructions of the control section 100.

The display section 110 is for example configured of a liquid crystal display, and displays an operation screen and the like for operating the image forming apparatus 30 based on the image signals supplied from the control section 100. On the operation screen displayed are, for example, setting buttons for conducting various settings, such as a sheet size and a number of printing sheets, relating to the printing, and power source button for making power-on or power-off of the image forming apparatus 30. The power source button may be provided, for example, with two separate buttons of power-on button and power-off button. The power-on operation of the image forming apparatus 30 includes a case of putting on a main power source, and a case of recovering from an energy saving mode. In the case of recovering from the energy saving mode to a normal mode, the power source can be activated to be power-on state by a job transmission without operating the power button. Further, the power-off operation of the image forming apparatus 30 includes a case of shutting off the main power source, and a case of switching to the energy saving mode.

Operation section 112, being configured with a wired or wireless keyboard, a mouse and the like, generates operation signals according to user's input operations and provides to control section 100. For example, the operation section 112 receives various setting of the print job based on the user's input operations or the input information for power-on/power-off of the image forming apparatus 30, generates the operation signals corresponding to the received input information and provides to the image forming apparatus 100. Therefore, the power of image forming apparatus 30 can be put on or turned off with a remote control from the information processing apparatus 10. As the operation section 112, a touch-panel system combined with display section 110 can be utilized.

Based on various setting of the a job JB or the input information indicating the power-on/power-off of the image forming apparatus 30 (hereinafter, the case of power-on will be described) provided from the operation section 112, the control section 100 generates a job JBa for executing a printing or power-on information DpA indicating the power-on information of the image forming apparatus 30, and the like, and transmits to server 20. At this time, the control section 100 supplies these information by adding an IP address (second identification information) allocated to information processing apparatus 10A or a user ID (first identification information) of a user who is using the information processing apparatus 10A onto the job JBa or the power-on information DpA. The user ID of user A may be directly inputted through the operation section by the user, or may be acquired by making a reading device come close to a non-contact type IC card and the like.

[Block Configuration Example of Server]

Figure 3:
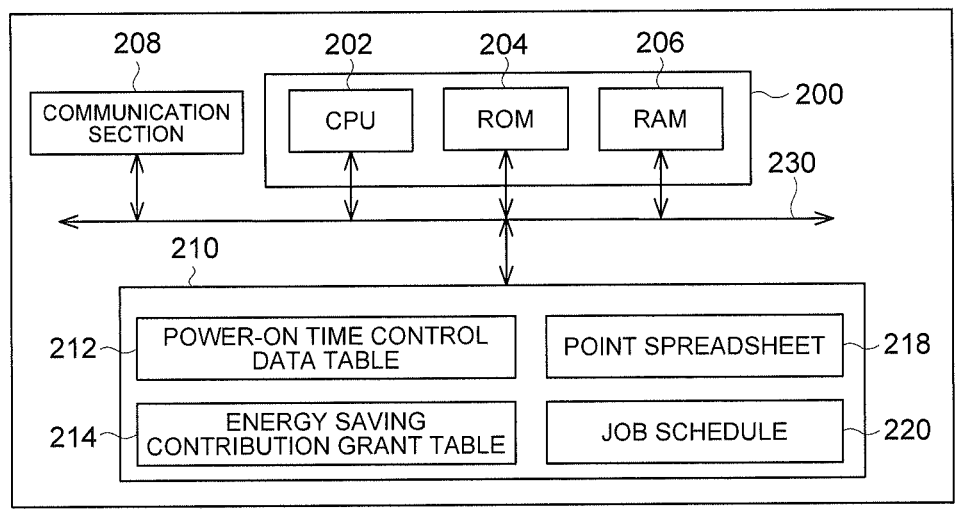
FIG. 3 is a drawing to show a block configuration example of a server.

FIG. 3 shows an example of block configuration. As shown in FIG. 3, server 20 is provided with control section 200 to control the total operation of the server 20. The control section 200 has CPU 202, ROM 204, and RAM 206. The CPU 202 develops a program or data readout from the ROM 204 on the RAM 206, and activates the program to control the operation of each part of the server 20.

The control section 200 records the power-on information Dp received by communication section 208 and the IP address and the user ID corresponding to the power-on information Dp, and controls the number of power-on operation times and a time of power-on, and the like. And then, as described later, grants an energy saving contribution rate with respect to the image forming apparatus 30 according to the number of power-on operation times and with or without of job JB transmission, and based on counting results of the energy saving contribution rate, gives an incentive or a negative incentive to the user for using the image forming apparatus 30. Meanwhile, not by controlling one of each user or each of the information processing apparatus 10, the control section 200 may control, as necessary, both the number of power-on times and the power-on time for each user and the number of power-on times and the power-on time for each information processing apparatus 10.

To the control section 200, communication section 208 and memory section 210 are connected via bus 230. Being configured with a modem and a rooter and the like, the communication section 208 establishes communications with each information processing apparatus 10, and acquires the job JB, power-on information Dp and the like being transmitted from the information processing apparatus 10. Further, by establishing communications with the image forming apparatus 30, the communication section 208 provides the job JB and power-on information Dp and the like transmitted from the information processing apparatus 10 to the image forming apparatus 30.

Memory section 210 is configured with a nonvolatile memory such as a semiconductor device and an HDD (Hard Disk Drive). On the memory section 210, recorded are power-on time control data table 212 for controlling an acquisition time of power-on information Dp (ON indication time) indicating the power-on of image forming apparatus 30 and the number of acquisition times, transmitted from each information processing apparatus 10, and point spreadsheet 218, and recorded in addition are energy saving contribution rate grant table 214 to be used in cases of granting the energy saving contribution rate, and other job schedule 220. Further, on the memory section 210, the IP address of the information processing apparatus 10 for identifying a source of the power-on information Dp, and the user ID of the user who uses the information processing apparatus 10 are correlated and recorded.

[Configuration Example of Power-On Time Control Data Table]

FIG. 4 shows an example of configuration of the power-on time control data table 212 to be recorded on the memory section of server 20. As shown in FIG. 4, on the power-on time control data table 212, each name of user who uses each information processing apparatus and a time when the each user conducted power-on operation of the image forming apparatus 30 (hereinafter referred as power-on time), more specifically the time when the server 20 received the power-on information Dp, are correlated and recorded. The power-on time are segmented by each unit time period in a predetermined recording time period, and recorded. The recording time period and the unit time period can be arbitrarily set through the operation section 112. From the viewpoint of fairness, for example, the recording time period is working hours, and the unit time period is one hour.

The power-on time is recorded by separating the information into: the information in cases where the user does not execute the power-on operation of the image forming apparatus 30 nor transmit the job JB; the time when the user transmitted the job JB after executing the power-on operation of the image forming apparatus 30; the time when the user transmitted the job JB without executing the power-on operation of the image forming apparatus 30; and the information in cases where the user does not transmit the job JB after executing the power-on operation of the image forming apparatus 30. Wherein, since a case of the time when the user transmitted the job JB after executing the power-on operation of the image forming apparatus 30; and a case of the time when the user transmitted the job JB without executing the power-on operation of the image forming apparatus 30 are same in the energy saving contribution level (refer to FIG. 5), these two cases are configured with the same recording information.

For example, with respect to user D, the time "9:35" when the image forming apparatus is powered-on between 9 to 10 o'clock is recorded, and the information "*", indicating to the effect that even the user has powered-on the job JB is not transmitted, is recorded. Subsequently, between 10 to 11 o'clock, the information "–" indicating to the effect that the user did not power-on and the job JB is not transmitted, is recorded.

[Configuration Example of Power Saving Contribution Rate Grant Table]

FIG. 5 shows an example of configuration for the power saving contribution rate grant table 214. The power saving contribution rate is an index to indicate a rate of contribution to power saving of the image forming apparatus 30, and a prescribed contribution rate is granted to the user based on conditions such as the number of operation times for power-on of the image forming apparatus 30, with or without transmission of the job JB, and the like. In the present example, a high energy saving contribution rate (point) is granted to a user of small number of power-on operation times for the image forming apparatus 30.

As shown in FIG. 5, in the power saving contribution rate grant table 214, conditions indicating with or without the power-on operation and job JB transmission of the image forming apparatus 30, with or without the job execution (if the image forming apparatus 30 is used for executing a job), conditions of power source in the image forming apparatus 30, the power saving contribution rate, and the point based on the power saving contribution rate are respectively correlated and recorded.

With respect to a user who has not operated to power-on and has not transmitted the job JB, namely who has not used the image forming apparatus at all, the energy saving contribution rate of "FIRST" is granted and a point "+1" is given corresponding to the contribution rate.

With respect to a user who has operated to power-on and has transmitted the job JB, the energy saving contribution rate of "SECOND" is granted and a point "0" is given corresponding to the contribution rate. With respect to a user who has not operated to power-on and has transmitted the job JB, the energy saving contribution rate of "SECOND" is granted and a point "0" is given corresponding to the contribution rate. This is the case where, for example, when the image forming apparatus is powered-on due to the usage by a user, the other user transmits a job 313. With respect to a user who has not transmitted the job JB even has operated to power-on, an energy saving contribution rate of "THIRD" is given as the case of least contribution to the energy saving, and a point "–1" is given corresponding to this contribution rate.

[Configuration Example of Point Spreadsheet]

FIG. 6 shows an example of point spreadsheet 218 to be recorded in the memory section 210 of server 20. As shown in FIG. 6, in the point spreadsheet 218, a user name who uses the information processing apparatus 10, the point corresponding to the energy saving contribution rate, and counted result, which is obtained by each user and by each unit period, by tallying the point granted by each unit period are respectively correlated and recorded to be controlled as a point tallying data.

With respect to user A for example, based on the number of power-on operation times of the image forming apparatus 30 and with or without the job transmission, point "+1" is given and recorded for the period between 9 to 10 o'clock, point "0" is recorded for the period between 10 to 11 o'clock, and as the final counting result, point "+6" is recorded. This point spreadsheet 218 can be displayed on the display section of each information processing apparatus 10, and each user can confirm the energy saving contribution rate for the image forming apparatus 30.

[Configuration Example of Job Schedule]

FIG. 7 shows an example of job schedule 220 to be controlled by memory section 210 of server 20. As shown in FIG. 7, each job JB transmitted from each information processing apparatus 10 is managed in the order of having been received by the server 20. Then, by the order of job schedule 220, each job JB is provided to the image forming apparatus 30, and the image forming processing and the like based on each job JB is executed. In the present example, an execution order of a job for the user who has been given an incentive is prioritized, and an execution order of a job for the user who has been given a negative incentive is postponed in the execution order,

[Block Configuration Example of Image Forming Apparatus]

Figure 8:
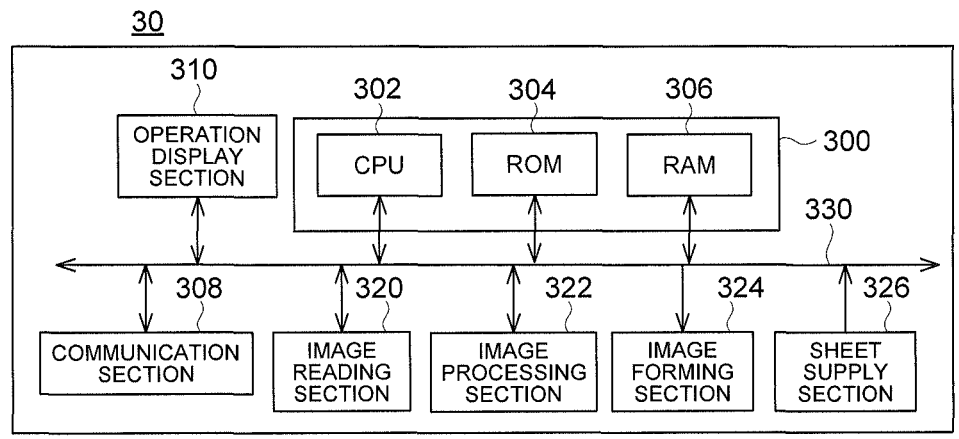
FIG. 8 is a drawing to show a block configuration example of image forming apparatus.

FIG. 8 shows an example of block configuration of image forming apparatus 30. As shown in FIG. 8, provided is control section 300 to control the overall operation of the image forming apparatus 30. The control section 300 includes CPU 302, ROM 304 and RAM 306. On the RAM 306, CPU 302 develops the program and data readout from ROM 304, and activates the program to control each part of the image forming apparatus 30.

To the control section 300, communication section 308, operation display section 310, image reading section 320, image processing section 322, image forming section 324 and sheet supply section 326 are respectively connected via bus 330. The communication section 308 is, for example, configured with modem, router and the like, establishes communications with the server 20, and receives the job JB and power-on information Dp supplied from the server 20.

The image reading section 320 scans an original document placed on a platen with a laser beam and the like, converts the reflected light from the original document to electric signals, executes an A/D conversion to form an image data, and supplies to the image processing section 322. The image forming section 322 performs, for example, an analogue processing to the image data supplied from the image reading section, and thereafter supplies to the image forming section 324.

By utilizing an electrophotographic process, the image forming section 324 uniformly charges a photosensitive drum with a charging unit, forms a latent electrostatic image by exposing the photosensitive drum with laser beams from an exposure unit, and at a developing unit, develops the latent image by attaching toners on the surface of the photosensitive drum, then transfers the developed toner image on the sheet supplied from the sheet supply section 326.

The operation display section 310 is configured with a display device such as a liquid crystal being combined with a position input device of pressure sensitive type or electrostatic type. The operation display section 310 detects a pushed-down position on a screen of the display device, generates an operation signal corresponding to the detected position and supplies it to the control section 300.

The control section 300 executes the image forming process such as the printing based on the job JB received by the communication section 308, and in addition, makes the main power source into power-on state based on the power-on information Dp received by the communication section 308. In case that a power-off information Dpo is transmitted, the control section 300 makes the main power source into power-Off state. Further, the control section 300 is capable of performing an energy saving mode such as a sleep mode, and in cases where the energy saving mode is set and there is no job JB for a prescribed period, the control section makes transition to the energy saving mode, and when a job JB is transmitted from the information processing apparatus 10, restores to a normal mode.

[Example of Server Operation in Case of Granting Energy Saving Contribution Rate]

Figure 9:
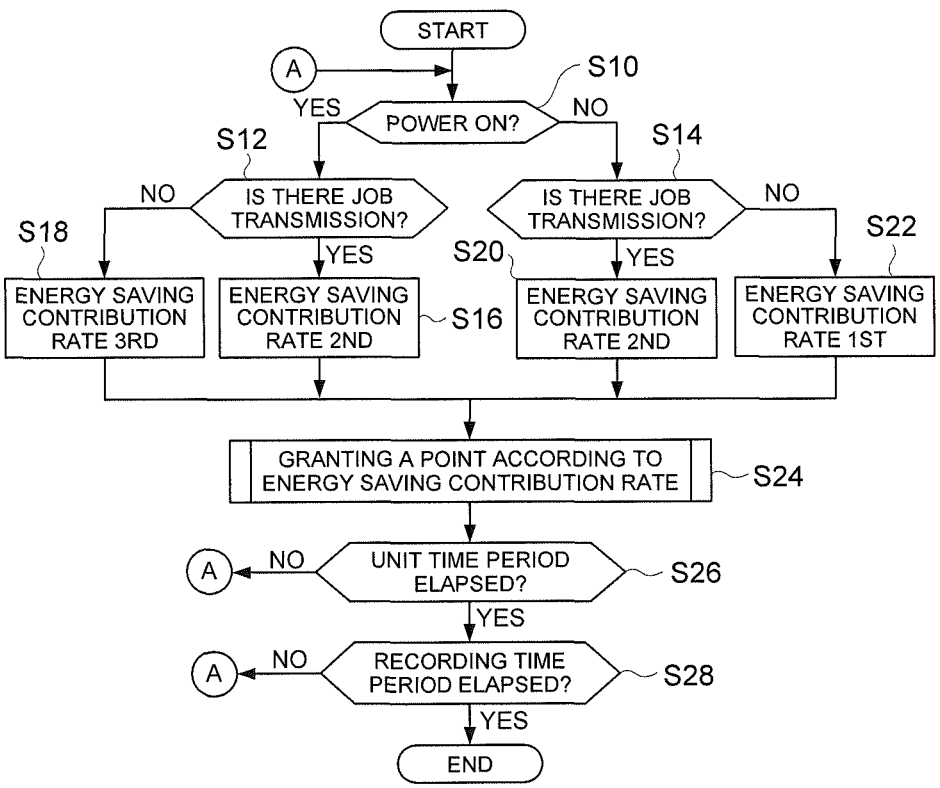
FIG. 9 is a flowchart to show an operation example of the server in case of granting a energy saving contribution rate based on a number of power-on times of the image forming apparatus.

Next, an operation example of server 20 will be described. FIG. 9 is a flow chart showing an operation example of CPU 202 in the server 20. In the example below, the case is mainly described, as shown in FIG. 1, where user A uses the information processing apparatus 10A to transmit a job JBa and power-on information DpA. And, in the present example described is the case of doing power-on operation for the image forming apparatus 30 which being in the power-off state.

As shown in FIG. 9, in step S10, CPU 202 determines whether or not the power-on information DpA for making power-on of the image forming apparatus 30 is transmitted from the information processing apparatus 10A. Whether or not the power-on information DpA is transmitted from the information processing apparatus 10A is determined based on IP address or user ID attached on the power-on information DpA. In case that the power-on information DpA is determined to have been transmitted from the information processing apparatus 10A, the CPU 202 proceeds to step S12, and in case that the power-on information DpA is determined not to have been transmitted from the information processing apparatus 10A, proceeds to step S14.

In the step S12, CPU 202 determines whether or not, after the power-on information DpA has been transmitted from the information processing apparatus 10A, a job JBa is subsequently transmitted from the same information processing apparatus 10A. Whether or not the job JBa is transmitted from the information processing apparatus 10A is determined based on IP address or user ID attached on the power-on information DpA. In case that the job JBa is determined to have been transmitted from the information processing apparatus 10A, the CPU 202 proceeds to step S16, and in case that the job JBa is determined not to have been transmitted from the information processing apparatus 10A, proceeds to step S18.

In case that the power-on information DpA and the job JBa have been received from the information processing apparatus 10A, in the step S16 the CPU 202 refers to the energy saving contribution grant table 214 and grants energy saving contribution rate "SECOND" with respect to the user A of information processing apparatus 10A. On the other hand, in case of having received only the power-on information DpA from the information processing apparatus 10A, in the step S18 the CPU 202 refers to the energy saving contribution grant table 214 and grants energy saving contribution rate "THIRD" with respect to the information processing apparatus 10A.

On the other hand, in case that the power-on information DpA has not been transmitted from the information processing apparatus 10A, the CPU 202 determines, in the step S14, whether or not the job JBa is transmitted from the information processing apparatus 10A. Namely the CPU determines the case where user A has transmitted the job JBa to the image forming apparatus 30 while the image forming apparatus is in power-on state due to having been used by the other user or the like. In case that the job JBa is determined to have been transmitted from the information processing apparatus 10A, the CPU 202 proceeds to step S20, and in case that the job JBa is determined not to have been transmitted from the information processing apparatus 10A, proceeds to step S22.

In case that the power-on information DpA is not received and only the job JBa have been received from the information processing apparatus 10A, in the step S20 the CPU 202 refers to the energy saving contribution grant table 214 and grants energy saving contribution rate "SECOND" with respect to the user A of information processing apparatus 10A. On the other hand, in case of having not received the power-on information DpA or the job JBa from the information processing apparatus 10A, in the step S22 the CPU 202 refers to the energy saving contribution grant table 214 and grants energy saving contribution rate "FIRST" with respect to the user A of information processing apparatus 10A.

Figure 10:
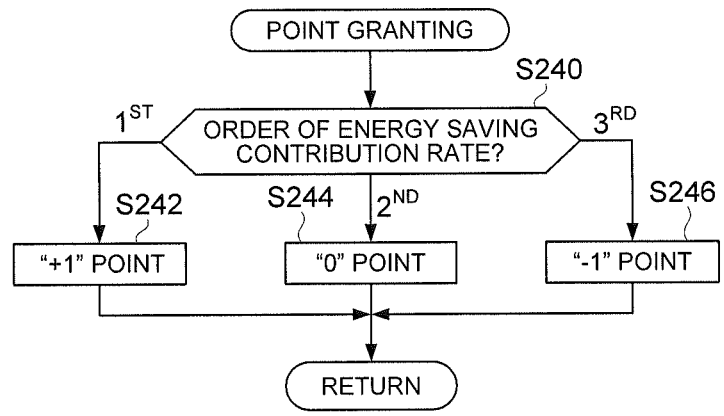
FIG. 10 is a flowchart to show an operation example of the server in case of granting the point.

After finishing the granting of energy saving contribution rate, in the step S24, the CPU 202 grants a point corresponding to the energy saving contribution rate. FIG. 10 is a sub routine showing an example of operation of the server 20 in the case of granting the point. As shown in FIG. 10, in the step S240, the CPU 202 discriminates the order of energy saving contribution rate granted to the information processing apparatus 10A, and in the case of the energy saving contribution rate being "FIRST", proceeds to step S242, in the case of the energy saving contribution rate being "SECOND", proceeds to step S244, and in the case of the energy saving contribution rate being "THIRD", proceeds to step S246.

In case that the user A of the information processing apparatus 10A obtained the energy saving contribution rate "FIRST", the CPU 202 refers, in the step S242, to the energy saving contribution grant table 214 and gives point "+1" to the user A.

In case that the user A of the information processing apparatus 10A obtained the energy saving contribution rate "SECOND", the CPU 202 refers, in the step S244, to the energy saving contribution grant table 214 and gives point "0" to the user A.

In case that the user A of the information processing apparatus 10A obtained the energy saving contribution rate "THIRD", the CPU 202 refers, in the step S246, to the energy saving contribution grant table 214 and gives point "−1" to the user A. Upon finishing these series of point giving operation, the CPU 202 proceeds to step S26 shown in FIG. 9.

As shown in FIG. 9, in step S26, the CPU 202 determines whether or not a previously determined unit time period (for example, 1 hour) has elapsed. The unit time period can be arbitrarily set by an operation of the operation section 112 in the information processing apparatus 10A or by an operation of the operation display section 310 in the image forming apparatus 30. In case of determining that the unit time period has elapsed, the CPU 202 proceeds to step S208. On the other hand, in case of determining that the unit time period has not elapsed, the CPU 202 returns to the step S10 to repeat the above described operation in the unit time period.

In case of being determined that the previously determined time period has elapsed, the CPU 202 determines, in step S28 whether or not a predetermined recording period (for example, from 9 to 17 o'clock) has elapsed. In case of determining that the recording period has been elapsed, the CPU 202 terminates the series of operations, such as, for granting the energy saving contribution rate and giving the point, and executes a process operation shown in FIG. 11, to be described later. On the other hand, in case of being determined that the recording period has not elapsed yet, the CPU 202 returns to the step S10 to execute the granting of energy saving contribution rate and granting points based on the number of power-on operation times by the user in the next unit time period.

[Example of Server Operation in Case of Giving Incentive or Negative Incentive to User]

Figure 11:
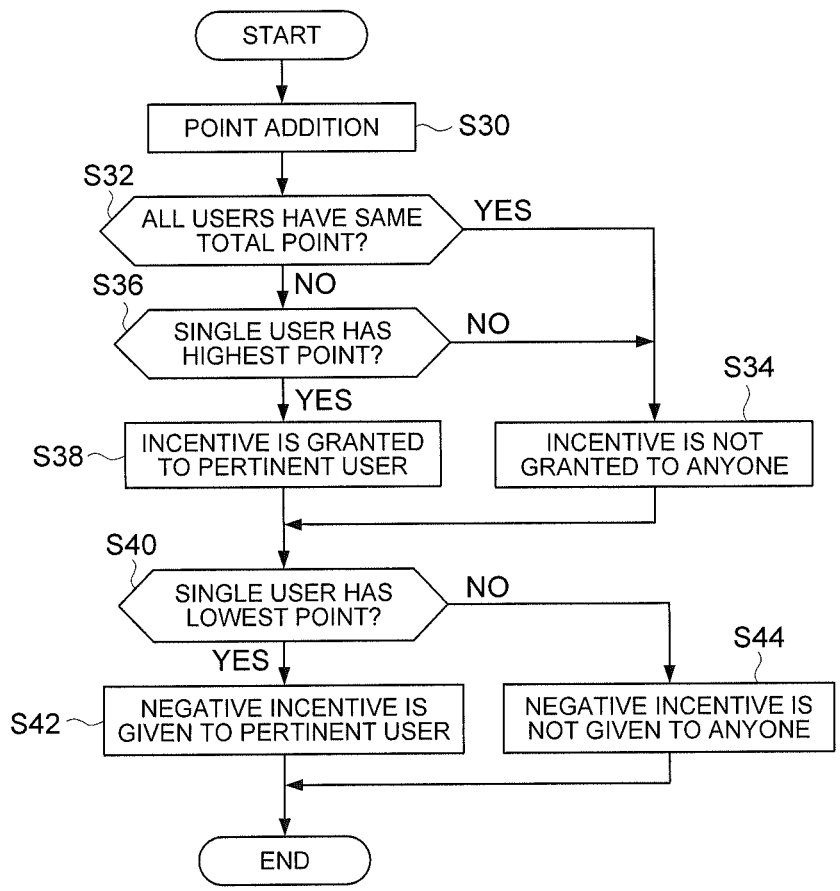
FIG. 11 is a flowchart to show an operation example of the server in case of granting the incentive/negative-incentive.

FIG. 11 is a flow chart to show an operation example of the server 20 in the case of giving an incentive or a negative incentive. As shown in FIG. 11, in step 30, the CPU 202 adds the point which has been given based on the energy saving contribution grant table 214 by each unit time period, and tallies the total point by each unit time period to form the point spreadsheet 218 shown in FIG. 6.

In step S32, by referring to the point spreadsheet 218, the CPU 202 determines whether or not all users have the same total point. In case of all users being determined to have the same total point, the CPU 202 proceeds to step S34, and in case of all users being determined not to have the same total point, proceeds to step S36.

In case of total point of every users being same, the CPU 202 does not grant an incentive to any of the users. This is because the case where an incentive is given only to one user may improve a competitive spirit of the users, and energy saving may be effectively promoted. Naturally, all users may be given the incentive.

In step S36, the CPU 202 determines whether or not a single user has the highest total point. In case that the user having the highest total point is determined as one person, the CPU 202 proceeds to step S38, and in case that plural users have the highest point, proceeds to step S34.

In the step S38, the CPU 202 gives the incentive to the user having the highest total point. Specifically, the CPU 202 records in the memory section 210 a user ID of the user having the highest total point, or an IP address of the information processing apparatus 10 which is used by said user, as an object person for the incentive. And, when the job JB is transmitted from the information processing apparatus 10, the CPU 202 determines whether or not the user ID or IP address attached to the transmitted job JB coincides with the user ID or the IP address of the object person for the incentive, and based on the determination, specifies if the user is given the incentive. The job processing of the user given with the incentive will be described later.

On the other hand, in cases where there is a plurality of users who have the highest total point, the CPU 202 does not give the incentive to any of the users, in step S34. This is because the case where an incentive is given only to one user may improve a competitive spirit of the users, and energy saving may be effectively promoted. Naturally, in the case of a plurality of users having the highest total point, all users may be given the incentive.

Subsequently, in step S40, the CPU 202 determines whether or not a single user has the lowest total point. In case that the user having the lowest total point is determined as one person, the CPU 202 proceeds to step S42, and in case that plural users have the lowest point, proceeds to step S44.

In the step S42, the CPU 202 gives the negative incentive to the user having the highest total point. Specifically, the CPU 202 records in the memory section 210 a user ID of the user having the lowest total point, or an IP address of the information processing apparatus 10 which is used by said user, as an object person for the negative incentive. And, when the job JB is transmitted from the information processing apparatus 10, the CPU 202 determines whether or not the user ID or IP address attached to the transmitted job JB coincides with the user ID or the IP address of the object person for the negative incentive, and based on the determination, specifies if the user is granted the negative incentive. The job processing of the user granted with the negative incentive will be described later.

On the other hand, in cases where there is a plurality of users who have the lowest total point, the CPU 202 does not grant the negative incentive to any of the users, in step S44. This is because the case where the negative incentive is given only to one user may improve a competitive spirit of the users, and energy saving may be effectively promoted. Naturally, in the case of a plurality of users having the lowest total point, all these plurality of users may be given the negative incentive.

[Example of Server Operation in Case that Incentive Having Been Given to User]

Figure 12:
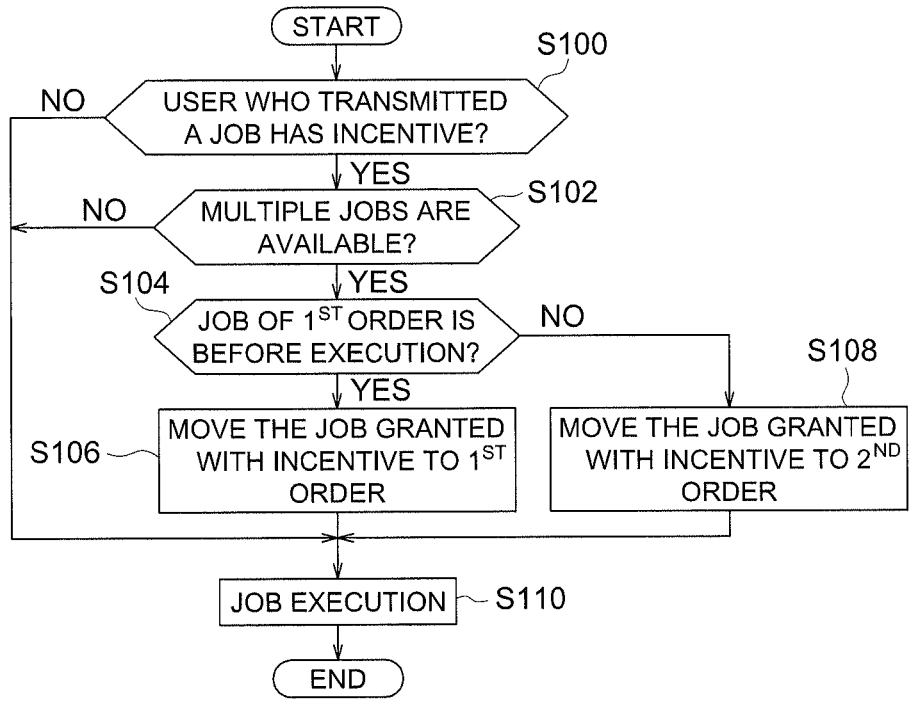
FIG. 12 is a flowchart to show an operation example of the server in case of having granted the incentive.

FIG. 12 is a flow chart to show an operation example of the server 20 in the case of having given an incentive to a user. As shown in FIG. 12, in step S100, the CPU 202 determines whether or not an incentive has been given to the user who transmitted a job. Specifically, the CPU 202 determines whether or not the user ID or IP address attached to the transmitted job JB coincides with the user ID or the IP address of the object person previously registered for the incentive. In case of determining the coincidence of the user ID or the IP address, the CPU 202 determines that the user who transmitted the job has been given with the incentive, and proceeds to the step S102. On the other hand, in case of determining that the user ID or the IP address does not coincide, the CPU 202 determines that the user who transmitted the job has not been given with the incentive, and proceeds to the step S110.

In the step S102, the CPU 202 refers to the job schedule 220 to determine whether or not multiple reserved jobs are available in the job schedule. Namely, determines whether or not another job JB is available other than the job JB that has been granted with the incentive. In case of determining that the multiple reserved jobs are available, the CPU 202 proceeds to the step S104, and in case of determining that the multiple reserved jobs are not available, the CPU proceeds to the step S110.

In the step S104, the CPU 202 determines whether or not the first ordered job JB in the job schedule 220 is prior to execution. In case of determining that the first ordered job JB is prior to execution, the CPU 202 proceeds to the step S106, and in case of determining that the first ordered job JB is under execution, the CPU 202 proceeds to the step S108.

Figure 13:
FIG. 13 is a drawing to explain an operation example (No. 1) of the server in case of changing a job execution order in the job schedule.

In the step S106, in case of the first ordered job JB being prior to execution, the CPU 202 moves the job JB of the user granted with the incentive to the first order, and executes said job JB in priority over the other job. FIG. 13 shows an example of job JB processing (No. 1). In FIG. 13, assumed is that an incentive has been given to user A, job JBb of user B and job JBc of user C are previously transmitted to the server 20, and these jobs JBb and JBc are prior to execution. As shown in FIG. 13, when job JBa of user A is received by the server 20, the CPU 202 moves the order of the job JBa of user A to the first order, and postpones the job order of the job JBb of user B and the job JBc of user C respectively by one order number.

On the other hand, in case of determining that the first ordered job JB is under execution, the CPU 202 moves the job JB of the user granted with the incentive to next order (second order) to the job JB being under execution, and executes said job JB in priority over the other job. FIG. 14 shows an example of job JB processing (No. 2) of the user given with an incentive. In FIG. 14, assumed is that an incentive has been given to user A, job JBb of user B and job JBc of user C are previously transmitted to the server 20, and job JBb of user B is under execution. As shown in FIG. 14, when job JBa of user A is received by the server 20, the CPU 202 moves the order of the job JBa of user A to the next order of the job JBb of user B, and postpones the job order of the job JBc of user C.

Returning to FIG. 12, in step S110, the CPU 202 sequentially supplies the job JB of each user based on the job order in the job schedule 220, to the image forming apparatus 30. Thus, image forming process, according to the content of each job JB, is executed in the image forming apparatus 30.

[Example of Server Operation in Case that Negative Incentive Having Been Given to User]

Figure 15:
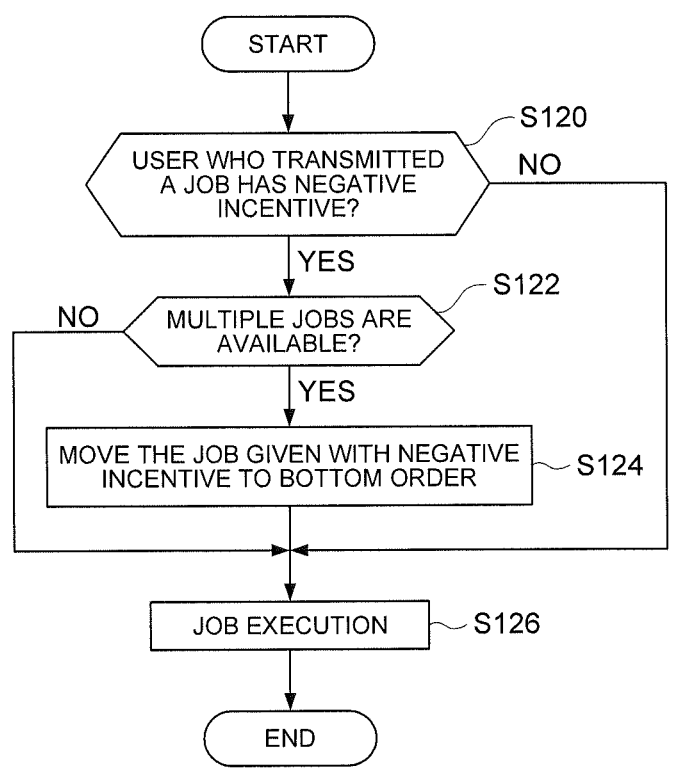
FIG. 15 is a flowchart to show an operation example of the server in case of having granted the negative-incentive.

FIG. 15 is a flow chart to show an operation example of the server 20 in the case of giving a negative incentive to a user. As shown in FIG. 15, in step S120, the CPU 202 determines whether or not a negative incentive has been given to the user who transmitted a job. Specifically, the CPU 202 determines whether or not the user ID or IP address attached to the transmitted job JB coincides with the user ID or the IP address of the object person previously registered for giving the negative incentive. In case of determining the coincidence of the user ID or the IP address, the CPU 202 determines that the user who transmitted the job has been given the negative incentive, and proceeds to the step S122. On the other hand, in case of determining that the user ID or the IP address does not coincide, the CPU 202 determines that the user who transmitted the job has not been given the negative incentive, and proceeds to the step S126.

In the step S122, the CPU 202 refers to the job schedule 220 to determine whether or not multiple reserved jobs are available in the job schedule 220. For example, determines whether or not another job JB is received after receiving the job JB of the user given with the negative incentive. In case of determining that the multiple reserved jobs are available, the CPU 202 proceeds to the step S124, and in case of determining that the multiple reserved jobs are not available, the CPU proceeds to the step S126.

Figure 16:
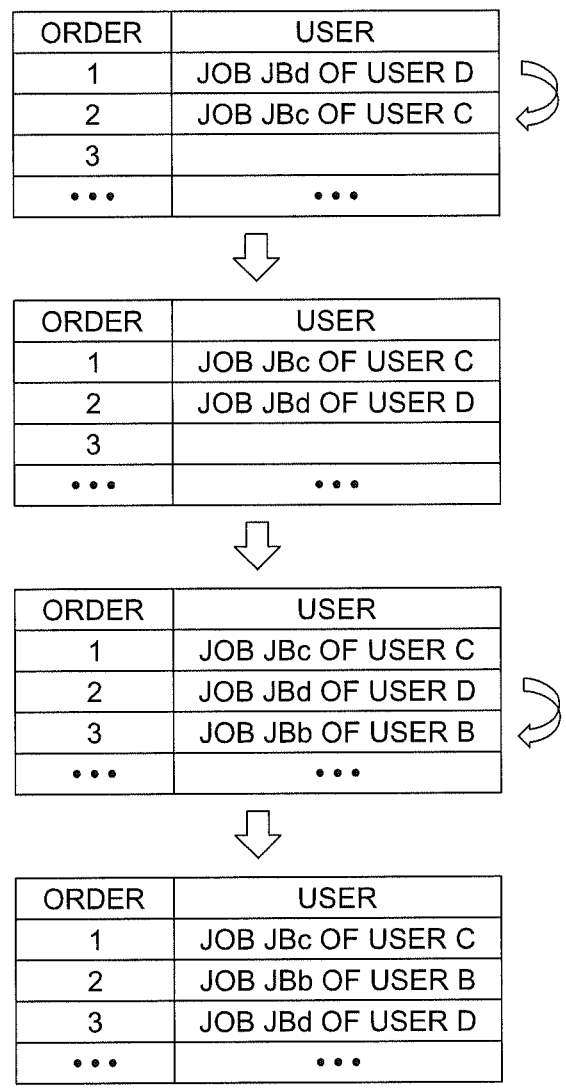
FIG. 16 is a drawing to explain an operation example of the server in case of changing a job execution order in the job schedule.

In the step S124, the CPU 202 moves the job JB of the user given with the negative incentive to the end of order, and preferentially executes the job JB which being newly transmitted to the server 20 from the other user. FIG. 16 shows an example of job JB processing of the user who has been registered with a negative incentive. In FIG. 16, assumed is that a negative incentive has been given to user D, and after receiving the job JBd of user D, the job JBc of other user C and the job JBb of user B are transmitted to the server 20. As shown in FIG. 16, in case of receiving the job JBc of user C after receiving the job JBb of user B, the server 20 moves the order of the job JBd of user D to the end of the job order, and moves the job order of the job JBb of user B to the first order. After that, if the job JBb of user B is received, the server 20 moves the order of the job JBd of user D further to the end job order, and moves the job JBb of user B to the second order next to the job JBc.

Returning to FIG. 15, in step S126, the CPU 202 sequentially supplies the job JB of each user based on the job order in the job schedule 220, to the image forming apparatus 30. Thus, image forming process, according to the content of each job JB, is executed in the image forming apparatus 30.

FIG. 17 shows an example of relationship between counting periods of the energy saving contribution rate (point) based on the number of power-on operation times in the image forming apparatus 30 and granted period for giving the incentive/negative-incentive. The server 20 feedbacks the counting result based on the energy saving contribution rate counted in the day to each user, as the incentive/negative-incentive for the next day such as privileges of preferential execution of the job JB. And in the granted period of the incentive/negative-incentive, the server 20 tallies the energy saving contribution rate based on the number of power-on operation times during this period, and feedbacks the result as the incentive/negative-incentive for the next day such as privileges of preferential execution of the job JB. In this way the server 20 repeats to execute the process of the counting period and the granted period alternately. In the above description, although the counting period and the granted period are displaced by one day, these may be displaced by the unit of hours.

As described above, according to the first embodiment, since the number of power-on times in the image forming apparatus 30 is controlled, user's consciousness for energy saving in image forming apparatus can be improved by utilizing the controlled number of power-on times. Particularly, in the first embodiment, by granting the energy saving contribution rate according to the number of power-on times and giving the incentive or negative incentive regarding the job execution order, user's consciousness for energy saving in the image forming apparatus 30 can be enhanced. As the result, users would avoid the unnecessary power-on of the image forming apparatus 30, and the energy saving of the image forming apparatus 30 can be effectively promoted.

2. The Second Embodiment

In the second embodiment, memory usage capacity is increased or reduced for a user given with an incentive or negative incentive, which is different from the first embodiment. Other configurations of information processing apparatus 10, server 20 and image forming apparatus 30 are similar to those of the above described first embodiment, therefore, common structural elements are attached with the same codes, and their detailed explanation will be omitted.
[Example of Memory Configuration]

FIG. 18 shows a configuration example of RAM 206 in server 20. As shown in FIG. 18, RAM 16 includes exclusive memory 206a allocated to user A, exclusive memory 206b allocated to user B, exclusive memory 206c allocated to user C, exclusive memory 206d allocated to user D, and operational memory 206e.

The operational memory 206e is a memory area that is given as a privilege to a user who has been given with an incentive, and in case that the user has been given with the incentive, exclusive right of the operational memory 206e is changed to the user. Thus, only the said user is allowed to use the operational memory 206e. In the initial state, the exclusive right is set as "no relevant user available". In the present example, memory capacity of each exclusive memory 206a, 206b, 206c, and 206d is Y (MB), the capacity of operational memory 206e is Y×10%/100% (MB), and the total capacity is X (MB). Wherein, the above exclusive memory 206a, 206e and the like may be configured with a memory other than the RAM 206.
[Example of Server Operation in Case that Incentive Having Been Given to User]

FIG. 19 is a flow chart to show an operation example of the server 20 in the case of having given an incentive to a user. As shown in FIG. 19, in step S130, the CPU 202 determines whether or not an incentive has been given to any user. For example, the CPU 202 can determine whether or not the incentive is given based on whether or not a user is registered in memory section 210 as a registrant given with the incentive. In case of determining that the incentive has been granted to any of the user, the CPU 202 proceeds to the step S132. On the other hand, in case of determining the incentive has not been granted to any user, the CPU 202 proceeds to the step S134.

Figure 20:
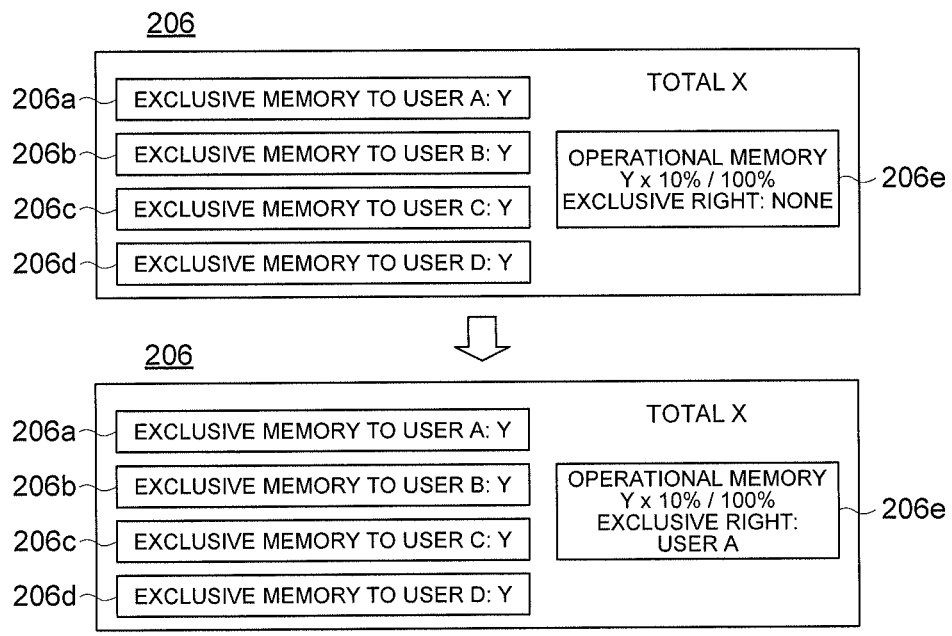
FIG. 20 is a drawing to explain an operation example of the server in case of changing an exclusive right for an operational memory.

In the step S132, the CPU 202 changes the exclusive right of the operational memory 206e to the user who has been given with the incentive. FIG. 20 shows a processing example of changing the exclusive right of the operational memory 206e to the user who has been given with the incentive. As shown in FIG. 20, in the state before granting the incentive, the exclusive right of the operational memory 206e is not given to any user. While, when the incentive is given to user A for example, the CPU 202 changes the exclusive right of the operational memory 206e to the user A. Thus, the exclusive memory capacity of the user A increases from the previous capacity of Y (MB) by Y×10%/100% (MB), and becomes to be Y+(Y×10%/100%) (MB).

In cases where the incentive is not given to any of the user, in the step S134, the exclusive right of the operational memory 206e is made to be "no relevant user available", and each user has the usual memory usage capacity.
[Example of Server Operation in Case that Negative Incentive Having Been Given to User]

Figure 21:
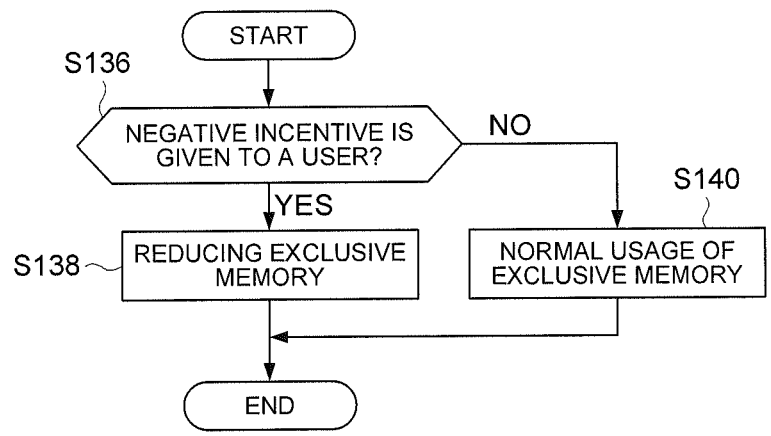
FIG. 21 is a flowchart to show an operation example of the server in case of having granted the negative-incentive.

FIG. 21 is a flow chart to show an operation example of the server 20 in the case of having given a negative incentive to a user. As shown in FIG. 21, in step S136, the CPU 202 determines whether or not a negative incentive has been given to any user. For example, the CPU 202 can determine whether or not the negative incentive is given based on whether or not a user is registered in memory section 210 as a registrant given with the negative incentive. In case of determining that the negative incentive has been given to any of the user, the CPU 202 proceeds to the step S138. On the other hand, in case of determining the negative incentive has not been given to any user, the CPU 202 proceeds to the step S140.

Figure 22:
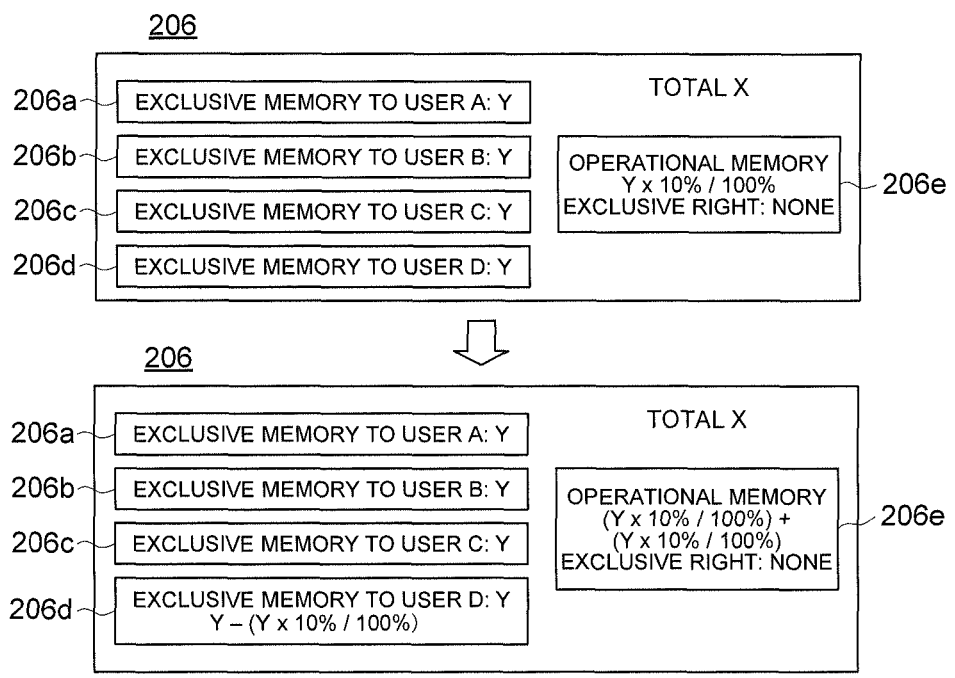
FIG. 22 is a drawing to explain an operation example of the server in case of changing a usable capacity of exclusive memory.

In the step S138, the CPU 202 reduces the exclusive memory capacity allocated to the user who has been given the negative incentive. FIG. 22 shows a processing example of reducing the capacity of exclusive memory 206d allocated to user D who has been given the negative incentive. As shown in FIG. 22, in the state before giving the negative incentive, the capacity of exclusive memories 206a-206d are equally allocated to each users of A-D. While, when the negative incentive is given to user D for example, the CPU 202 reduces the initially allocated capacity of the exclusive memory for the user D by a certain amount. For example, the capacity of exclusive memory allocated to the user D is reduced from the initial capacity of Y (MB) by Y×10%/100% (MB), and becomes to be Y−(Y×10%/100%) (MB).

In cases where the negative incentive is not given to any of the user, in the step S140, the exclusive memory for each user is not reduced, and each user can use the exclusive memory as usual.

As described above, according to the second embodiment, since the number of power-on times in the image forming apparatus 30 is controlled similarly to the first embodiment, user's consciousness for energy saving in image forming apparatus can be improved by utilizing the controlled number of power-on times. Particularly, in the second embodiment, by granting the energy saving contribution rate according to the number of power-on times and giving the incentive or negative incentive regarding the capacity of memory usage, user's consciousness for energy saving in the image forming apparatus 30 can be enhanced. As the result, in order to obtain the incentive, users would avoid the unnecessary power-on of the image forming apparatus 30, and the energy saving of the image forming apparatus 30 can be effectively promoted.

To give the incentive or the negative incentive as in the first and second embodiments is not essential, but at least to control the number of power-on times of the image forming apparatus 30 is required. By utilizing this, user's consciousness for energy saving in image forming apparatus can be improved. For example, only displaying the point spreadsheet 218 on the operation display section 310 of the image forming apparatus 30 or the display section 110 of each information processing apparatus 10 may do well. In organizations of companies or communities, by establishing criteria for each user or each group based on this point spread sheet 218, the energy saving of the image forming apparatus 30 can be activated.

The technical scope of the present invention should not be restricted to the above described embodiment, but includes embodiments applied with various changes without departing from the spirit of the present invention. For example, in the first and second embodiments, although the server 20 and the image forming apparatus 30 are configured as respectively independent units, functions of the server 20 may be installed in the image forming apparatus 30. In this case, the control of the number of power-on times and the granting of incentive and negative incentive may be executed by the control section 300 of the image forming apparatus 30, or may be executed by a separately installed control section.

Further, in the above embodiments, the information processing apparatus 10 to be used by each user is previously fixed, however not being restricted by this, users may use any of the information processing apparatus. Even in this case, since the number of power-on operation times is controlled based on the user ID assigned to the user, the incentive and the negative incentive can be surely given by each user who executed the power-on operation.

Further, in the above first and second embodiments, the incentive and the negative incentive are given to each user, however not being restricted by this, the incentive and the negative incentive may be given to the information processing apparatus 10 to be used by each user. Further, by counting the total point of each group in which each user belongs, and based on this total point the incentive and the negative incentive may be given by the each group. Further the incentive/negative incentive of the first embodiment and the incentive/negative incentive of the second embodiment may be combined.

Although in the first embodiment, the case is described where a main power switch of the image forming apparatus 30 being OFF, the present invention can be applicable to the case where the image forming apparatus 30 is in a state of energy saving mode. In this case, since the power source recovers to ON-state upon the transmission of job TB, the energy saving contribution rate can be granted by assuming that this case corresponds to the pattern in the case of "This user powered on the image forming apparatus and transmitted a job JB" in the energy saving contribution rate grant table 214 of FIG. 5.

EXPLANATION OF CODES 10, 10A, 10B, 10C, 19D: information processing apparatus
20: server
30: image forming apparatus
108: communication section
112: display section
202: CPU
208: communication section
210: memory section
214: energy saving contribution rate grant table
500: image forming system

What is claimed is:

1. A data control apparatus, which is connected to a plurality of information processing apparatus and controls information, relating to an image forming apparatus, transmitted from the information processing apparatus, the data control apparatus comprising:
  a communication section to receive power-on information, transmitted from the information processing section, for making the image forming apparatus into a power-on state, and identification information indicating a user who uses the information processing apparatus having transmitted the power-on information or the information processing apparatus having transmitted the power-on information; and
  a control section to control a number of power-on times of the image forming apparatus based on the power-on information and the identification information, received by the communication section;
  wherein the control section grants a contribution rate for energy saving of the image forming apparatus by each of the information processing apparatus or by each of the user of the information processing apparatus.

2. The data control apparatus of claim 1, wherein the control section gives an incentive in case of using the image forming apparatus to the information processing apparatus or to the user, based on the contribution rate.

3. The data control apparatus of claim 2, wherein in cases where a plurality of job is available, the control section places a higher priority in a job execution order onto the job of the information processing apparatus or the user having been given with the incentive than the other job.

4. The data control apparatus of claim 2, further comprising a memory section having a plurality of exclusive memory allocated by each of the information processing apparatus or by each of the user, wherein
  the control section increases a usable capacity of the exclusive memory for the information processing apparatus or the user having been given with the incentive.

5. The data control apparatus of claim 1, wherein the control section gives a negative incentive in case of using the image forming apparatus to the information processing apparatus or to the user, based on the contribution rate.

6. The data control apparatus of claim 5, wherein in cases where a plurality of job is available, the control section places a job execution order of the job of the information processing apparatus or the user having been given with the negative incentive at a tail.

7. The data control apparatus of claim 5, further comprising a memory section having a plurality of exclusive memory allocated by each of the information processing apparatus or by each of the user, wherein
  the control section reduces a usable capacity of the exclusive memory for the information processing apparatus or the user having been given with the negative incentive.

8. The data control apparatus of claim 1, wherein the identification information is first identification information indicating the user who uses the information processing apparatus having transmitted the power-on information.

9. The data control apparatus of claim 1, wherein the identification information is second identification information indicating the information processing apparatus having transmitted the power-on information.

10. An image forming system comprising a plurality of information processing apparatus, a data control apparatus, and an image forming apparatus which are connected with each other, wherein
  the information processing apparatus comprises a first communication section to transmit power-on information for making the image forming apparatus into a power-on state, and identification information indicating a user who uses the information processing apparatus or indicating the information processing apparatus, and
  the data control apparatus or the image forming apparatus comprises:
  a second communication section to receive, from the information processing apparatus, power-on information, and identification information indicating a user who uses the information processing apparatus having transmitted the power-on information or indicating the information processing apparatus having transmitted the power-on information; and
  a control section to control a number of power-on times of the image forming apparatus based on the power-on information and the identification information,
  wherein the control section grants a contribution rate for energy saving of the image forming apparatus by each of the information processing apparatus or by each of the user of the information processing apparatus.

11. An image forming system of claim 10, wherein the information processing apparatus comprises a display section to display a counting result, controlled by the data control apparatus, of the number of power-on times of the image forming apparatus.

12. A data control method of an image forming system comprising a plurality of information processing apparatus, a data control apparatus, and an image forming apparatus which are connected with each other, the data control method comprising:

a step, by the information processing apparatus, of transmitting power-on information for making the image forming apparatus into a power-on state, and identification information indicating a user who uses the information processing apparatus or the information processing apparatus, and the steps, by the data control apparatus or the image forming apparatus, of:

receiving, from the information processing apparatus, power-on information, and identification information indicating a user who uses the information processing apparatus having transmitted the power-on information or the information processing apparatus having transmitted the power-on information; and controlling a number of power-on times of the image forming apparatus based on the power-on information and the identification information indicating the user who uses the information processing apparatus or indicating the information processing apparatus, wherein the control section grants a contribution rate for energy saving of the image forming apparatus by each of the information processing apparatus or by each of the user of the information processing apparatus.

13. A non-transitory computer-readable recording medium recorded therein a program to perform a data control method for a data control apparatus which is connected respectively to an information processing apparatus and an image forming apparatus, the data control method comprising the steps of:

receiving, from the information processing apparatus, power-on information, and identification information indicating a user who uses the information processing apparatus having transmitted the power-on information or the information processing apparatus having transmitted the power-on information; and controlling a number of power-on times of the image forming apparatus based on the power-on information and the identification information indicating the user who uses the information processing apparatus or the information processing apparatus, wherein the control section grants a contribution rate for energy saving of the image forming apparatus by each of the information processing apparatus or by each of the user of the information processing apparatus.

* * * * *